April 20, 1937.　　M. L. GOLDBERT ET AL　　2,077,687
PORTABLE ELECTRIC COOKING STOVE
Filed Dec. 7, 1934　　4 Sheets-Sheet 2
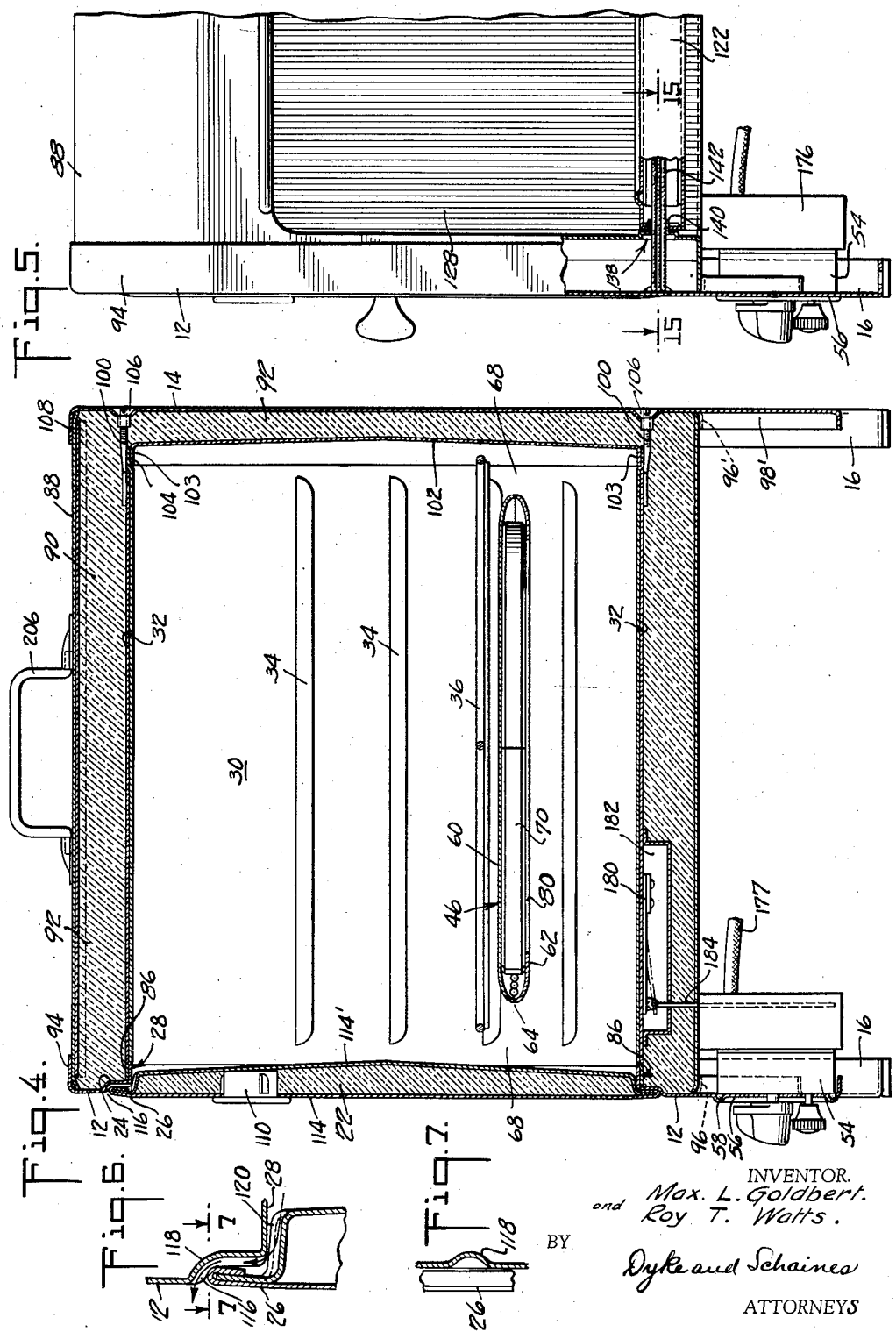
INVENTOR.
Max. L. Goldbert.
and Roy T. Watts.
BY Dyke and Schaines
ATTORNEYS

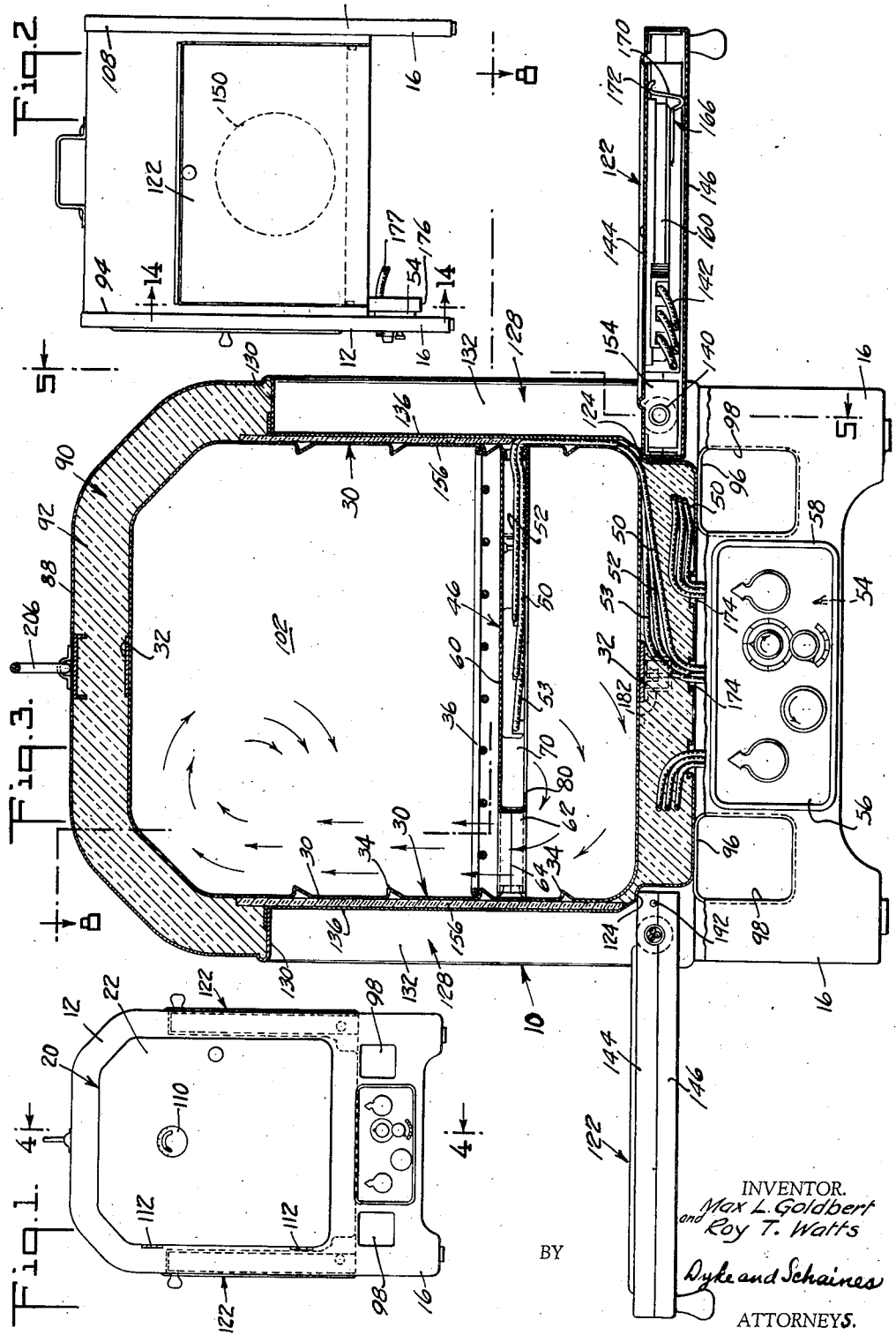

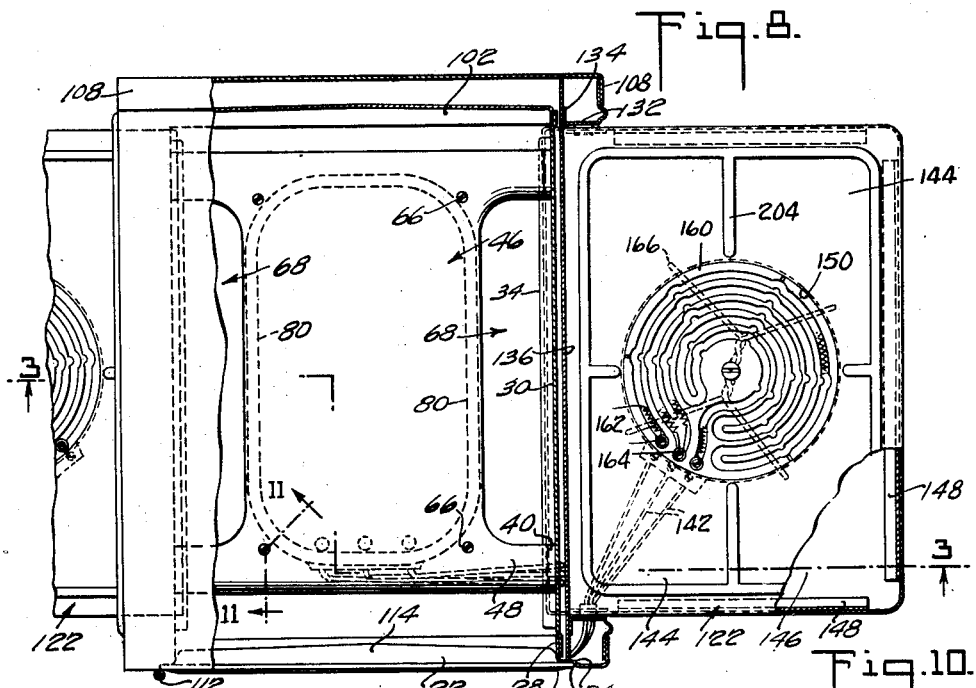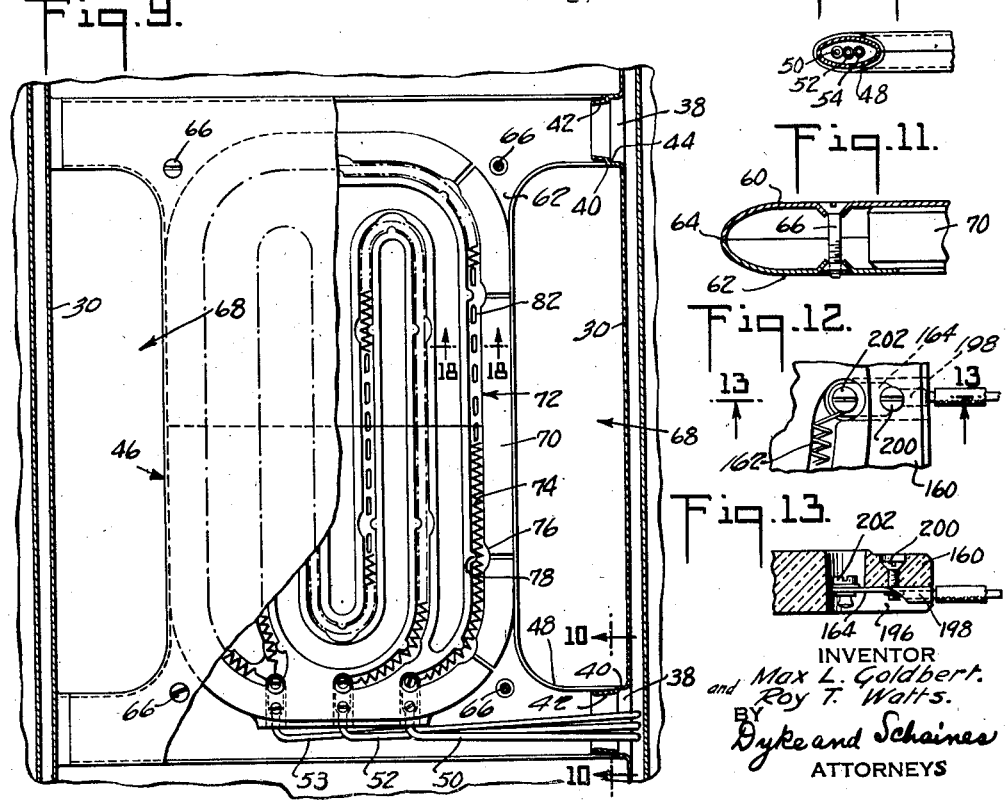

April 20, 1937.   M. L. GOLDBERT ET AL   2,077,687
PORTABLE ELECTRIC COOKING STOVE
Filed Dec. 7, 1934   4 Sheets-Sheet 4
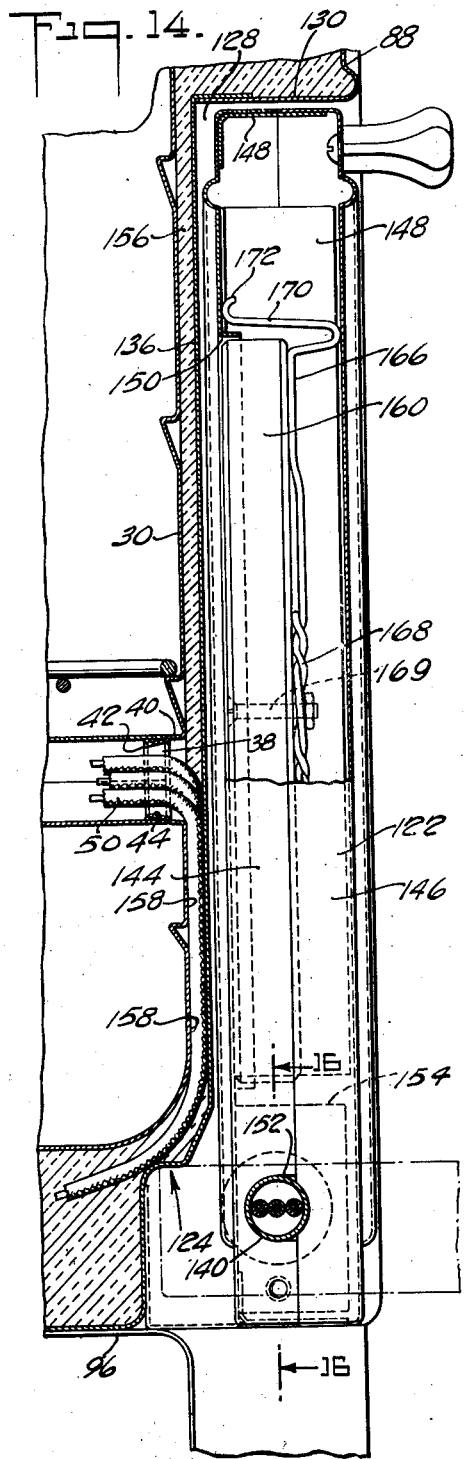
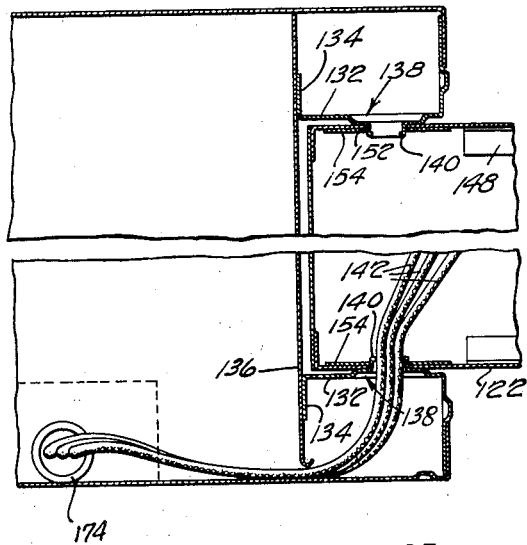
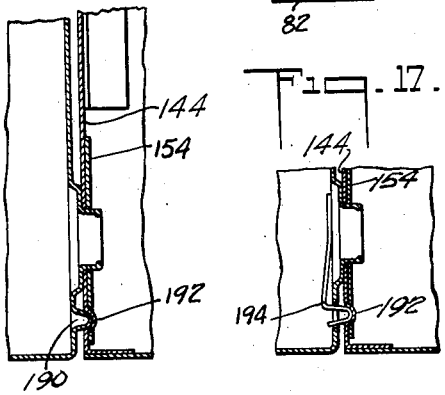
INVENTOR
Max L. Goldbert.
and Roy T. Watts.
BY
Dyke and Schaines
ATTORNEYS Patented Apr. 20, 1937

2,077,687

UNITED STATES PATENT OFFICE 2,077,687

PORTABLE ELECTRIC COOKING STOVE

Max L. Goldbert, New York, N. Y., and Roy T. Watts, Miami Beach, Fla., assignors to Electric Trading Corporation, New York, N. Y., a corporation of New York Application December 7, 1934, Serial No. 756,406

3 Claims. (Cl. 219—35)

Our invention relates to portable electric stoves, and particularly to portable electric ovens, and to such ovens combined with exteriorly located shelf cookers hinged to the main oven casing and adapted, when out of use, to be folded into the oven wall.

One object of the invention is to provide a supporting enclosure, reflector and heat distributor for the electrical heating unit for heating the oven, whereby the heating unit is exposed on the under surface only in order to make it more efficient for broiling and to secure better oven circulation and even cooking of foods placed above the heating unit for baking, with avoidance of under burning when baking.

Another object is to provide means for protection of the oven heating unit from being fouled or short-circuited by material dropping or running down on it from above.

Another object is to provide a structure of the type referred to which is adapted to be kept clean and sanitary by making all interior portions smooth and rounded and readily accessible for cleaning after use.

Another object is to provide an oven heating unit which is centrally disposed in the oven, with a cover plate over it leaving spaces between the cover plate and the oven walls for air circulation and even heating.

Another object of the invention is to provide an oven heater comprising a refractory plate with a metallic heat-ray reflecting cover over the upper side of the plate which contains the heating elements in their grooves, whereby the oven heating is accomplished through using the heating elements for first heating the grooved plate of porcelain or other refractory material containing same to high temperature, and then in turn making use of the highly heated porcelain plate or block to heat the oven, both for baking food placed above the unit heater, and for broiling food disposed beneath the oven heater.

Another object consists in providing an improved form of shelf heater or cooker located exteriorly to the oven with an improved hinge construction between the exterior electrically cooking member and the oven casing, comprising a hollow pintle portion through which the supply wires to the exterior heating appliances are passed, and providing for a minimum bending of the lead wires in use and protecting them against possible abrasion, as well as providing a simple and solid abutment on the oven wall for engagement by the foldable shelf cooker when turned down to the horizontal position.

Another object consists in the provision of an air vent for the oven formed partly in the door and partly in the casing so that same is exposed by halves on opening the door for convenient access to its parts so that it may be readily kept clean and unclogged.

In the accompanying drawings, illustrating an embodiment of the invention,

Fig. 1 is a front elevational view;

Fig. 2 is a side elevational view;

Fig. 3 is a section taken substantially on the broken line 3—3 of Fig. 8;

Fig. 4 is a central vertical longitudinal sectional view, taken on line 4—4, Fig. 1;

Fig. 5 is a sectional view taken substantially on the broken line 5—5 of Fig. 3;

Fig. 6 is a detailed sectional view showing the relation between door and frame to produce a vent opening therebetween;

Fig. 7 is a section on the line 7—7 of Fig. 6;

Fig. 8 is a sectional view taken substantially on the broken line 8—8 of Fig. 3;

Fig. 9 is a detailed sectional view, generally similar to Fig. 8, with the parts broken away and on an enlarged scale;

Fig 10 is a detailed section on line 10—10 of Fig. 9;

Fig. 11 is a detailed section taken substantially on the broken line 11—11 of Fig. 8;

Fig. 12 is an enlarged detail portion of Fig. 9;

Fig. 13 is a sectional detailed view on line 13—13 of Fig. 12;

Fig. 14 is an enlarged sectional view taken on the line 14—14 of Fig. 2, with parts broken away;

Fig. 15 is a section on line 15—15 of Fig. 5;

Fig. 16 is a detailed sectional view on line 16—16 of Fig. 14;

Fig. 17 is a fragmentary sectional view, similar to Fig. 16, but showing a modification; and Fig. 18 is a section on line 18—18 of Fig. 9.

The principal supporting members of oven casing 10 consist of the front and back wall members 12 and 14 of peripherally flanged stamped sheet metal, continued downwardly at the corners to provide the legs 16, 16. The front wall 12 has an opening formed therein at 20 to receive the front access door 22, wall member 12 being marginally recessed at 24 to receive the flanged over edge portion 26 of the door and provide a flush seating therefor when the door is closed, and member 12 being further inwardly flanged from such recessed portion 24 as indicated at 28, the oven lining member hereinafter referred to being secured to the front member 12 by such flange 28.

The oven lining member 30, which is surfaced on the interior with high heat baked porcelain or equivalent refractory and heat reflecting material, is preferably formed in two halves, being parted on a vertical central plane, and the two halves secured together in a butt joint giving a smooth flush finished surface on the interior of the oven by means of exterior butt straps 32, 32, preferably welded in place before the porcelain lining is applied. Inwardly projecting ribs 34, 34, for supporting food-carrying racks 36, and the like, are formed preferably by stamping in the side walls of the oven liner 30.

The side walls of the oven liner 30 are pierced by inwardly flanged front and back openings 38 on each side thereof, the flanges about the openings 38 being indicated at 40. The flange sleeves or thimbles 42 thus formed are preferably offset, as indicated at 44, to permit flush construction which is maintained throughout the interior wall construction in order to promote cleaning and sanitation and enable the user to keep the oven wiped clean after each period of use. The thimble openings 42 are preferably located at a level fairly low down toward the bottom of the oven, and serve for the mounting in the oven of the assembly containing the oven heating unit, indicated generally by reference character 46. The said assembly is arranged to provide a sheet metal plate with a heat-ray reflecting under surface over the electrical heating unit for heating the oven; also to provide for exposure of the heating unit on its lower surface beneath which food may be placed for braising, grilling and the like; and to provide a hollow, rounded structure for supporting the heating unit with rounded legs 48 adapted to be connected to the supporting thimbles 42 to thereby provide generally for a smooth rounded support at points of connection, and which is easily wiped and kept clean. In the case of one of the hollow legs 48 of said main assembly 46, provision is made for the enclosure and protection and easy insertion and assembly of the lead wires 50, 52 and 53 therethrough, said wires being passed through the thimble opening 38 within this hollow leg 48. These wires serve to conduct the electrical current to the heating element, and are lead up through the oven insulation hereafter referred to from the control box 54, which is located behind the plate portion 56 between the front legs 16, 16. Plate portion 56 forms a part of the front oven wall member 12. The sheet metal work is provided with ornamental and stiffening beads where required, as for example, such a bead 58 is provided in the plate portion 56 between the front legs in order to give same the desired strength and rigidity.

The heater unit assembly 46 preferably comprises upper and lower halves 60, 62, parted at the median horizontal line as indicated at 64, and secured together by screw devices such as screws 66.

Between the legs 48 on each side, the top and bottom plates 60, 62, are recessed or cut away to provide large lateral openings within the oven lining on each side of the heater unit assembly, as indicated at 68, 68, Fig. 9. Between plates 60, 62 is supported the block or plate 70 of refractory material, such as porcelain, and containing open on its upper face the grooves 72 for reception of coil wire electrical heating elements 74. Said grooves 72 are preferably not materially wider than necessary to receive the heating element coil 74 inserted through lateral extensions 76 of the grooves and past opposing ears 78 arranged on the opposite side of the groove and adapted to hold the heating element 12 downwardly. Grooves 72 are preferably quite deep, extending the greater portion of the way through the block 72, it being deemed preferable, in order to secure the best distribution of heat in use of the oven, to run the heating element with the porcelain block thereof heated to the highest possible temperature throughout, and such arrangement of grooves and wires being well adapted for this purpose, together with the heat reflection downward upon the heating element from the reflecting under surface of the plate 60. The heating elements may be arranged for high and low heat as may be desired, as for example, when the current is sent from either of the outer terminals 50, 53 through the intermediate terminal 52, a low heat will be obtained, whereas with use of all the heating elements, the maximum heat delivery is secured.

The under plate 62 of the assembly 46 is cut away beneath that portion of the block 72 containing the heating elements marked 70, as indicated at 80, to expose the under side of such block 70, and slots 82 are provided to extend from the grooves 72 through the under wall of block 70 in order to promote circulation of air to the heating elements and heat delivery by convection; and also to expose the heating elements to some extent to direct heat rays downwardly therethrough, although general heating of the block 70 is relied on for securing the delivery of heat in a downward direction.

As indicated by the arrows on Fig. 3, ample provision for air circulation and for even delivery of heat throughout the oven by convection is arranged for by the provision of the side openings 68, 68 mentioned above.

The oven liner 30, premade as just described, is attached to the in-turned flange portion 28 of the front wall member 12 by having the recessed marginal portion 86 thereof inserted over said flange 28 and attached thereto in any desired way, preferably by welding.

After these parts have been connected, as stated, the oven cover wall member 88, made sufficiently larger than the liner member 30 to provide a space 90 for reception of insulation material 92 therebetween, is also secured to front end wall 12 of the oven. The attachment of such cover wall 88 to the front end wall 12 is preferably made by inserting the forward end of the cover wall 88 within the peripheral flange 94 of front wall member 12 and inside the flanges 96 formed at the upper part of openings 98 made in the connecting plate portion 56 of said front wall 12 between the legs 16, 16.

Secured to the rear end of the butt straps 32 of the oven liner 30 are screws 100 projecting rearwardly beyond the back end of such liner member 30. After the inwardly flanged back plate 102 has been inserted with its flange 103 received in the flush finish forming recess 104 extending about the rear end of the liner 30, the back cover plate 14, containing as extensions thereof the rear leg 16, is assembled to the rest of the oven structure and held in place by nuts 106 of screws 100. The back cover plate 14 encircles the outer cover member 88 received in flange 108 of said back wall member 14, and is supported therein by flanges 96' formed about the openings 98' between the back legs.

After the back liner plate 102 is put on, and before the back wall member 14 is put on, the spaces 90 are filled with heat insulating material 92, preferably in the form of small granules, such form being preferred because of its ready adaptability to be substantially poured into the spaces provided for it. During the operation of insulating, the device is preferably arranged with the front face member 12 downward, in which position the insulation material can be most readily filled in as above described. The front door 22, which may contain the oven thermometer 110, is hinged to the front wall member 12 by hinges 112 and is preferably composed of front and rear sheets 114, 114', with the outer sheet flanged about the margin of the inner sheet and the intervening space filled with heat insulating material.

It is important to provide means for venting the oven for release of any pressures which may be created therein, and the like, and at the same time, it is important that the door be closed tightly in general so as to avoid loss of heat. We secure both these objects by providing a vent at 116 made by slightly recessing the door frame at 118 and/or recessing the margin of the door adjacent thereto, as indicated at 120, the door being made to fit tightly except for the vent openings so provided.

With this arrangement, it is easy to wipe out the halves of the vent when the oven is cleaned after use so there will be no deposition of objectionable grease or the like, or clogging of the vent, as would be the case if an ordinary vent hole were used.

The oven so far described may be made use of alone with the side walls insulated throughout if desired. However, it is preferable to provide additional heating devices for use in connection with the oven, and which can be extended for use and readily folded up when desired, and to have the wiring for the extra heating devices so provided unitary with the main wiring of the oven.

To such end the side walls of the oven are recessed on one side of the oven or both sides, preferably the latter, to receive shelf members adapted to be folded into such recesses when out of use and to be turned to down position when required for cooking purposes. According to the present invention, the shelf heating appliances, indicated generally by reference character 122, are securely hinged near their lower edges and are supported in their down position by the lower marginal portions of the shelves coming into engagement with an elongated broad, strong shoulder portion 124, of the casing wall.

For recessing the oven walls to receive the shelf cookers 122, the recesses 128 are defined by cutting out the material of the outer covering 38 for the oven, flanging same inwardly to define the top of said recess, as indicated at 130, and forming lateral inwardly directed flanges on each side thereof, indicated at 132, 132, and which said side flanges are continued laterally outward as indicated at 134, 134. To complete the outer wall covering and form the back wall of the recess 128, a back plate 136 is provided welded to return flanges 134, 134, and same extended across underneath the oven to form the outer covering therefor at the bottom thereof.

Hollow hinges are provided for hingedly supporting the shelf cookers by piercing the lateral flanges 132 at 138 and flanging same into thimbles 140, such thimbles serving as hollow pintles for the hinge construction and also to provide a channel for the insertion of lead wires 142 which extend from within the oven wall through such hollow pintle and into the shelf cookers yet to be described. The shelf cookers 122 are preferably constructed in two halves 144, 146 from flanged sheet metal, the lateral flanges being butt-jointed, and the hollow shelves so produced fastened together by internally disposed angle plates 148 which can be welded in place from the interior, access being provided through the hole 150 in the inner (or upper) half member 144 for the reception of the heating unit for the shelf cooker. The shelf cookers 122 are provided with openings 152 in the side walls thereof and in the reinforcing plates 154, and in the assembly said pintle thimbles 140 are received in said openings 152, thereby completing a very substantial and yet exceedingly simple arrangement of hollow hinge upon which the shelf can be swung up and down, and through which the lead wires are carried with minimum exposure to friction and bending.

Narrow space 156 between the back plate 136 of recess 128 and the liner member 30 is preferably filled with heat insulation material of sheet formation, the space at this region being relatively narrow and passages 158 are provided in such sheet material for carrying the main lead wires 50, 52 and 53 upwardly to lead same into the leg 48 of the main heating unit assembly.

The heating unit for the shelf cooker is preferably circular in form and comprises a circular block 160 having grooves in its upper surface for the reception of heating element coils 162 which are connected up to the lead wires 142 by terminals 164. Such heating units may be of any desired formation, the preferred formation therefor being described and claimed in our copending application executed on even date herewith and entitled "Electrical heating device".

For supporting the heating elements 160, we preferably provide a twisted wire arrangement indicated generally by reference character 166, and providing a framework 168 across the bottom of the heater block 160, and centrally secured to said block by screw 169. Said wire framework 166 terminates in transversely disposed arm members 170 which are preferably turned over at their ends, as indicated at 172, and which by contacting the front and back half members 144, 146 of the shelf cooker 122, serve to space and support the block 160 with the face thereof projecting through the opening 150 provided for its exposure in the upper half portion 144 of the shelf cooker.

The floor plate or under cover portion is provided with passages 174 for admission of the lead wires for the shelf cookers and these and the other wires are led down into the control box 54 to which the line wire connection is made, as indicated at 177.

A thermostat member 180 is preferably mounted on the under side of oven liner 30 and disposed within a cover box 182 provided therefor within the insulated space at the bottom of the oven, and the link 184 led therefrom for actuating switches or other control devices in any conventional arrangement disposed within the control box 176.

A snap holding means may be provided for holding the shelves in in or out position. In Fig. 16 a snap holding effect is obtained by bumping the lateral recess wall outwardly as indicated at 190, and bumping shallow socket recess within the side wall 144 of the shelf cooker, as indicated at 192. For the projection 190 formed in the recess side wall, a wire spring snap member may be substituted as indicated at 194, Fig. 17.

The terminal 164 may be received in an under groove 196 of the heating element block 160 and connected to the lead wire by compressible collar portion 198 and held upwardly against the bottom of the block 160 by connection screw 200, the inner end of said terminal 164 being extended into a portion of the groove in the upper surface of block 160 for receiving the heating element and connected to such heating element by a connection screw 202. It is important that both these connection screws be exposed on the upper surface of block 160 since access cannot be had thereto from beneath.

Raised ribs are provided at various places throughout the structure where desirable in order to impart strength or rigidity or to support objects in elevated position, for example, in Fig. 8 such raised ribs 204 are provided to support an object being heated above the heater block 160.

The portable range is preferably provided with a handle 206 for carrying it or moving about from place to place.

The invention also comprises modifications in and changes from the embodiment shown for illustration, and which may be made without departing from the scope of our claims.

We claim:

1. In an electric oven, a heating unit comprising a grooved refractory plate having openings formed to the back of the plate from the bottoms of the grooves to increase downward heating effect and to permit air circulation, with electrical heating elements in the grooves, said grooved face being exposed toward the oven top, and means comprising a metallic cover plate over the heating unit provided with a heat reflecting surface disposed to intercept the direct heat rays and shield objects thereabove from direct exposure to the heating unit, and to reflect the heat rays downwardly toward the oven bottom through said openings.

2. An electric oven as claimed in claim 1, wherein the grooved refractory block is supported within the oven by the metallic cover plate.

3. In an electrical cooking oven, a casing defining an oven therein, a permanent partition across the oven below the middle and having air circulation openings therethrough at the sides thereof, supporting an electrical heating unit enclosed therewithin, said partition being closed at the top and open at the bottom, whereby the heat rays from the unit will be reflected from the top and pass through the open bottom.

MAX L. GOLDBERT.
ROY T. WATTS.